United States Patent [19]

Neff et al.

[11] 4,191,503

[45] Mar. 4, 1980

[54] DEVICE FOR RELEASABLY SECURING ONE UNIT AGAINST A SECOND UNIT

[75] Inventors: Robert O. Neff, Milwaukee; Arthur K. White, Mequon; Norbert Hahn, Cudahy, all of Wis.

[73] Assignee: Rite-Hite Corporation, Brown Deer, Wis.

[21] Appl. No.: 874,119

[22] Filed: Feb. 1, 1978

[51] Int. Cl.² .................... B65G 67/02; B60D 7/00; G08B 21/00

[52] U.S. Cl. .................................. 414/401; 14/71.1; 52/173 DS; 114/213; 188/67; 340/687; 403/16; 403/27; 414/584

[58] Field of Search .................. 14/71.1, 69.5, 71.3; 214/38 B, 38 BB; 188/67; 114/213, 217; 340/668, 686, 687; 52/173 R, 173 DS; 403/16, 27; 414/401, 584

[56] References Cited

U.S. PATENT DOCUMENTS

| | | | |
|---|---|---|---|
| 1,418,966 | 6/1922 | Perin | 214/38 B |
| 2,019,949 | 11/1935 | Brace | 214/38 BB |
| 2,870,874 | 1/1959 | Politte | 188/67 |
| 3,893,730 | 7/1975 | Homier et al. | 188/67 X |
| 3,918,301 | 11/1975 | Baer | 340/668 |
| 3,961,714 | 6/1976 | Buehler | 214/38 B |
| 4,127,856 | 11/1978 | Bickel | 340/687 |
| 4,146,888 | 3/1979 | Grunewald et al. | 340/687 X |

Primary Examiner—Alfred C. Perham
Attorney, Agent, or Firm—Neuman, Williams, Anderson & Olson

[57] ABSTRACT

A device is provided for use in releasably securing one unit (e.g., the rear end of a truck vehicle) against a second unit (e.g., a loading dock). The device comprises an elongated member mounted for controlled endwise movement relative to a locking assembly, the latter being adjustably mounted on the loading dock. Carried by the elongated member and extending from an end thereof towards the truck is an attaching means which is secured to the truck. A friction means is adjustably mounted within the locking assembly for movement between operative and inoperative positions. When in an operative position, the elongated member can be moved endwise in only one direction away from the truck. When in an inoperative position, the elongated member can be moved in either endwise direction relative to the locking assembly. The friction means is biased to normally assume an operative position. Manually actuated means is carried on the locking assembly for moving the friction means from an operative position to an inoperative position.

10 Claims, 6 Drawing Figures

DEVICE FOR RELEASABLY SECURING ONE UNIT AGAINST A SECOND UNIT

BACKGROUND OF THE INVENTION

Positive securement of the rear end of a truck vehicle against a loading dock or the like is essential in avoiding serious problems and mishaps occurring during loading or unloading of a truck vehicle parked at a loading dock. Without proper securement, there is a real potential hazard in the truck vehicle inadvertently moving away from the dock while goods are being loaded on or removed from the truck bed by lift trucks or the like.

Heretofore, one effort to avoid such a potential hazard has been to utilize wheel blocks placed on the roadway beneath the truck and wedged against the front of the rear tires. Such a practice, however, is undesirable for one or more of the following reasons: (a) the blocks may become lost or damaged; (b) the roadway surface may be slippery due to spilled oil, rain, snow or ice and thus impair effectively wedging the blocks against the tires; and (c) the blocks are awkward to handle and sometimes difficult to remove from a wedged position.

Other attempts to obtain proper securement of the truck vehicle to the loading dock have involved the use of elaborate mechanisms which are of costly and complex construction, interfere with access to and from the truck bed, are not readily capable of being utilized with a wide variety of truck vehicle designs, and require an external source of pneumatic and/or hydraulic pressure in order to enable the mechanisms to opeate properly.

SUMMARY OF THE INVENTION

Thus, it is an object of the invention to provide a device which is not beset with any of the aforenoted shortcomings associated with prior devices of this general type.

It is a further object of the invention to provide a device which is easily installed and maintained and may be utilized in concert with dock leveling equipment and the like.

Further and additional objects will appear from the description, accompanying drawings, and appended claims.

In accordance with one embodiment of the invention, a device of the class described is provided for securing and retaining one unit against a second unit. The device comprises an elongated member mounted for controlled endwise movement relative to a locking assembly which is adjustably mounted on the second unit. Carried by the elongated member and extending from one end thereof towards the one unit is an elongated attaching means. The attaching means is adapted to be releasably connected to the one unit when the elongated member assumes a predetermined position with respect to the locking assembly and the one unit is positioned against the second unit. The locking assembly includes a friction means which is adjustably mounted for movement between operative and inoperative positions. When the friction means is disposed in an operative position, the exterior of the elongated member is engaged thereby so that the latter is movable endwise in only one direction away from the one unit. When the friction means is disposed in an inoperative position, the elongated element is capable of being moved endwise in opposite directions relative to the locking assembly. The friction means is biased to normally assume an operative position. Mounted on the locking assembly is a manually actuated means which is adapted to move the friction means from an operative position to an inoperative position.

DESCRIPTION

For a more complete understanding of the invention reference should be made to the drawings wherein.

Figure 1:
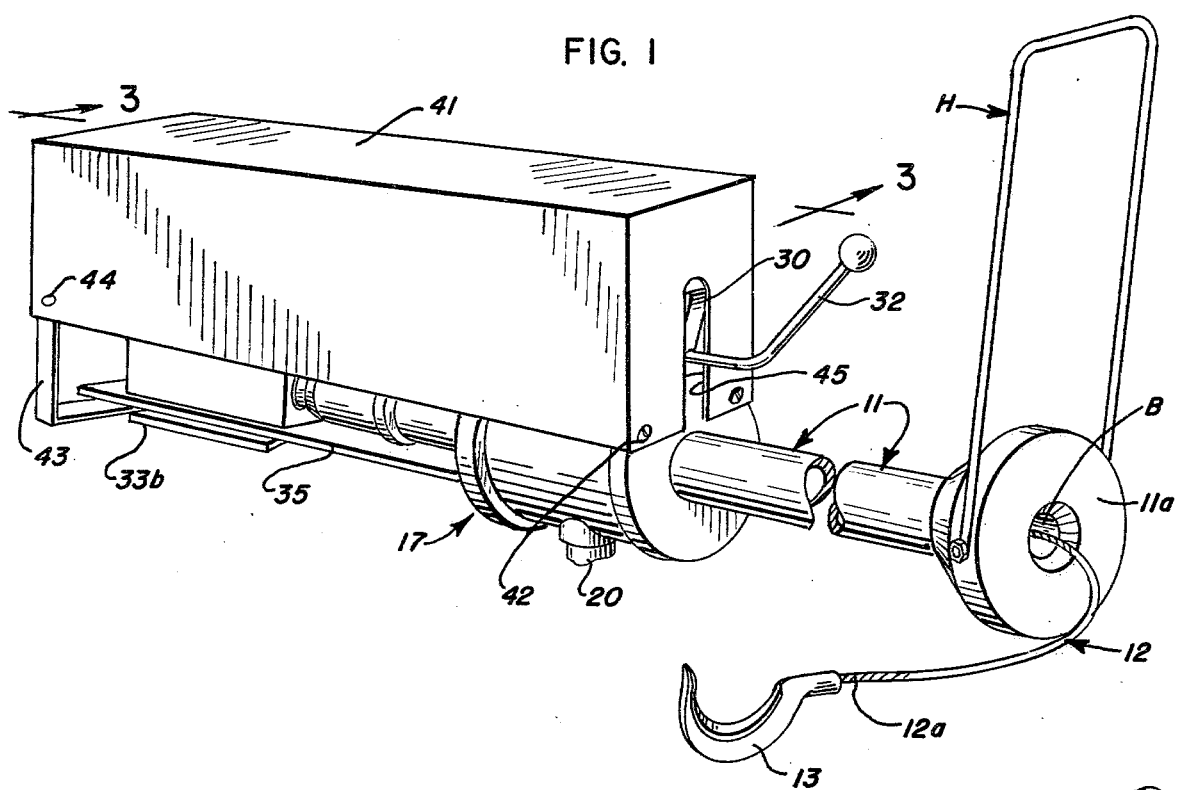
FIG. 1 is a fragmentary perspective view of one form of the improved device.
Figure 2:
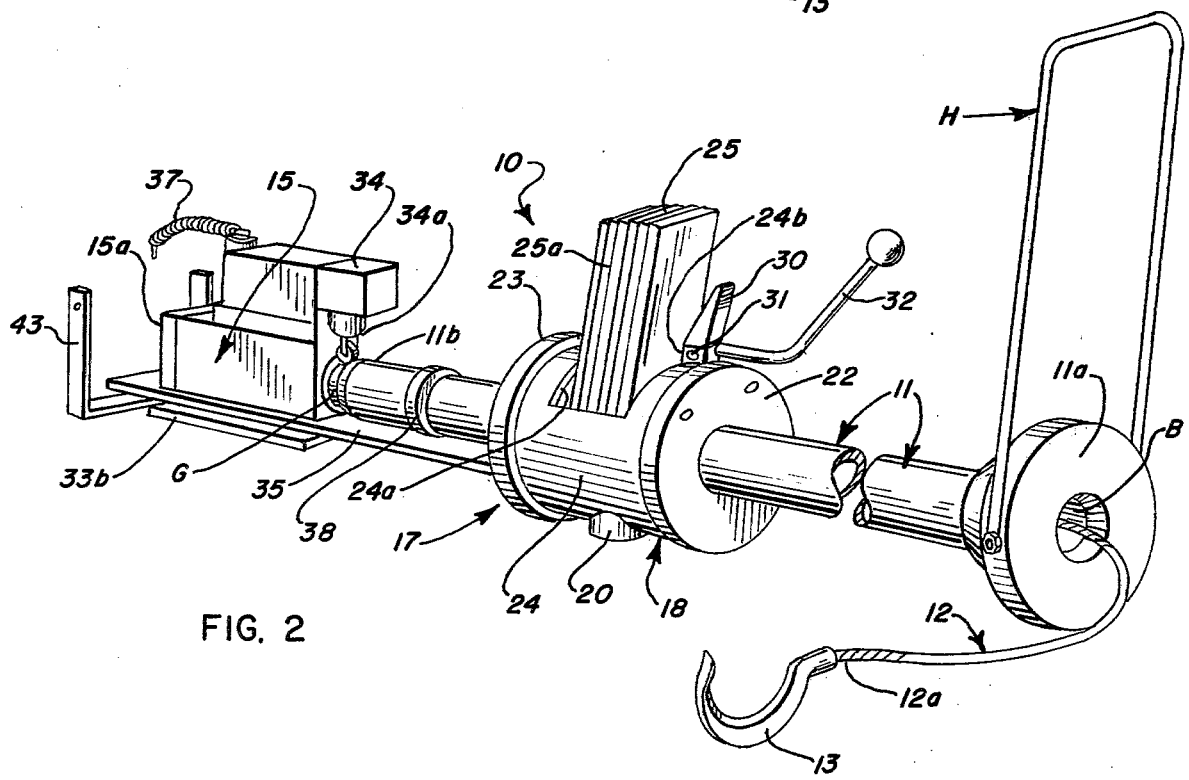
FIG. 2 is similar to FIG. 1 but showing the protective hood removed from the device.

Referring now to the drawings and more particularly to FIGS. 1 and 2, one form of the improved securing device 10 is shown which is readily adapted for use in releasably securing one unit (e.g., the rear end of a truck vehicle) not shown, against a second unit (e.g., a loading dock D). The loading dock, or platform, normally embodies an elevated horizontal surface Da which forms an extension of the floor of the warehouse or building in which the dock is provided. The dock is normally accessible from a roadway or ramp on which the truck vehicle is parked during loading and unloading thereof. The height of the horizontal surface is approximately the same as the height of the bed of the truck vehicle. Normal height differentials between the dock surface and the truck bed may be readily compensated for by leveling apparatus frequently incorporated in the dock itself and well known in the art.

When the truck vehicle is in position for loading and/or unloading, the rear end of the truck bed should be disposed in abutting relation with vertically extending bumpers or the like, not shown, which normally form a part of the dock construction. The device 10 to be hereinafter described is intended to effectively and readily secure the truck vehicle in proper position with respect to the dock bumpers and prevent the vehicle from inadvertently moving away from the dock during the loading and unloading operations.

Device 10 includes an elongated tubular member 11, the axis of which is disposed in spaced substantially parallel relation with respect to the horizontal surface Da of the loading dock. Carried by and extending through member 11 is an attaching means 12, which in the illustrated embodiment, is in the form of a flexible heavy duty cable. The cable projects from the forward enlarged end 11a of member 11; said end being disposed closest to the parked truck vehicle. The distal forward end 12a of the cable is provided with a hook 13, or some other suitable device, which is adapted to engage and be readily connected to a portion of the rear end of the truck vehicle.

Figure 3:
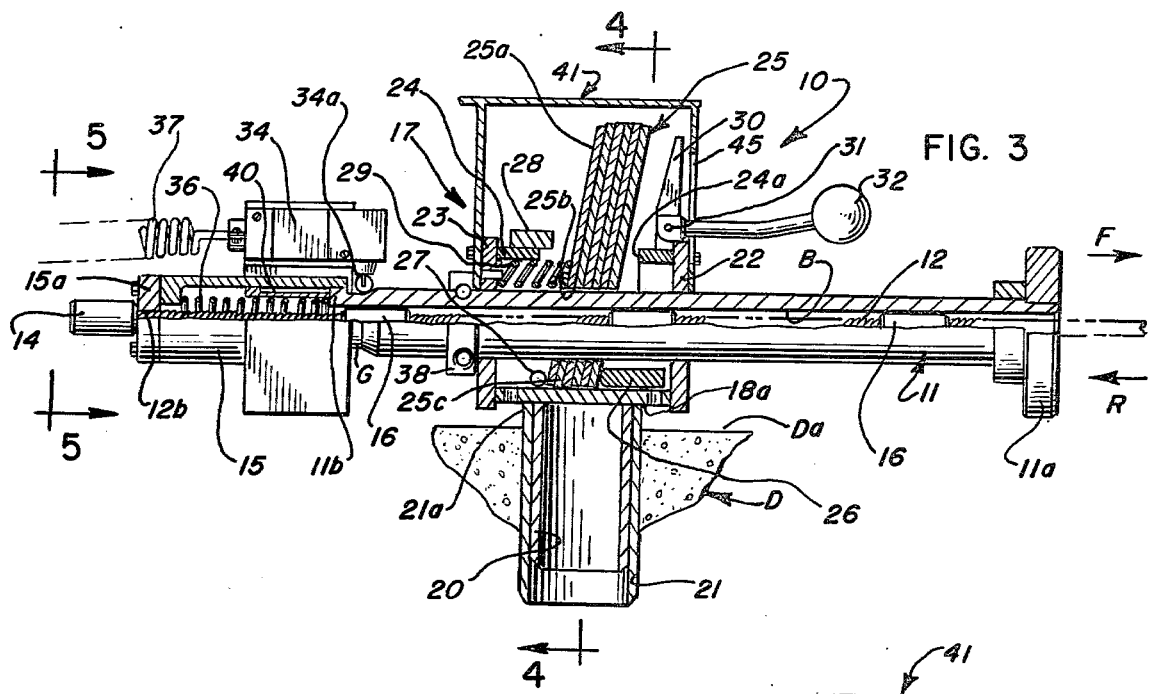
FIG. 3 is a fragmentary sectional view taken along line 3—3 of FIG. 1.

The opposite, or rear, end 12b of the cable 12 is provided with a block or stop piece 14 which is fixedly secured thereto and is adapted to abut against an adapter piece 15a carried by a telescoping element 15, the latter being disposed adjacent the rear end 11b of the elongated member 11, see FIG. 3. The operation of element 15 will be discussed more fully hereinafter. The opening in piece 15a will allow the cable itself to pass therethrough but not the block 14. To facilitate assembly of the piece 15a on the element 15 and around the cable extending forwardly of block 14, the piece may be provided with an open end transverse slot 15b through which the cable will pass, see FIG. 5.

Spaced longitudinally from block 14 along the cable 12 and affixed thereto are a plurality of spaced, elongated guides 16 which are sized to slidably engage the surface of the center bore B, formed in elongated member 11.

Member 11 extends through and is supported by a locking assembly 17 which, in the illustrated embodiment, includes a cylindrically-shaped housing 18, the axis of which coincides substantially with the axis of member 11. Depending from housing 18 is a studlike element 20 which is adapted to engage in a slip-fit relation a sleeve 21, anchored in a recess formed in the dock surface Da, see FIG. 3. When the element 20 and sleeve 21 are in assembled relation, the housing 18 is free to swivel about the sleeve 21 as an axis but not in a lateral direction with respect thereto; thus, as the cable 12 is drawn up taut and the truck bed is against the dock bumpers, the elongated member 11 and the housing 18 will self-align themselves in a direction towards the point of connection between the cable hook 13 and the truck vehicle. The swivel axis is normally at a right angle with respect to the dock surface Da.

As seen in FIG. 3, the upper end 21a of the anchored sleeve 21 projects a slight amount above surface Da and slidably contacts a flattened surface area 18a formed on the underside of the housing 18 and from which the element 20 depends.

The housing 18 includes disc-shaped front and rear end plates 22, 23, respectively, and a cylindrically shaped center section 24 interconnecting the end plates. The upperside of the center section 24 is provided with an elongated cutout 24a through which extend the upper portions 25a of a plurality of friction plates 25, the latter being adjustably disposed within the housing 18. Each friction plate 25, in the illustrated embodiment, is of a similar rectangular configuration and is provided with a hole 25b formed in the lower portion 25c of the plate and through which the elongated member 11 is adapted to extend. The hole 25b in each instance is sized slightly larger than the circumference of member 11, so that when the plates are disposed perpendicular with respect to the axis of member 11, the latter is free to be manually adjusted endwise in opposite directions (arrows F and R) relative to the housing 18. The perpendicular disposition of the plates is referred to as an inoperative position.

When, however, the plates 25 assume a tilted, or askewed, position (referred to as an operative position) relative to the axis of member 11, as seen in FIG. 3, the member 11 is prevented by the plates from being adjusted in an endwise direction (arrow F) towards the truck vehicle because of the frictional engagement between the perimeter of the plate hole 25b and portions of the exterior of member 11. Notwithstanding the askewed position of the plates 25, the elongated member 11 may be manually moved endwise in a rearward direction (arrow R) away from the truck bed, thus enabling the cable to assume a taut condition after the hook 13 has lockingly engaged the rear end of the truck vehicle. As observed in FIG. 3, the plates are arranged in face-to-face relation and the lower edges thereof rest upon the interior surface of the lower portion of the housing center section 24 and are confined within an area defined by a forward stop 26 and a rear stop 27, both of which are affixed within the interior of the housing 18. The number of friction plates to be utilized may, if desired, be varied from that shown. In any case, however, when the plates are in operative positions, the greater the force exerted in direction F on cable 12, the greater the friction that will be applied on member 11 by the plates.

The size of the cutout 24a formed in center section 24 is such that the plates 25 can be moved without interference between operative and inoperative positions. An additional stop 28 is provided within the housing, rearwardly of the plates, and is adapted to be engaged by the rearmost friction plate when the latter is in its inoperative (perpendicular) position.

The plates 25 are biased by a spring 29 to normally assume an operative position, see FIG. 3. The spring 29 is disposed rearwardly of the plates and one end thereof engages the rearmost plate above the hole 25b thereof and the opposite end engages the interior surface of the rear end plate 23.

Movement of the plates 25 from their operative position to their inoperative position is effected by a manually actuated finger 30 which is pivotally connected at 31 to a projection 24b formed on the exterior of the housing center section 24. The projection 24b is disposed forwardly of the cutout 24a, see FIG. 2. Manual manipulation of the finger 30 is facilitated by a lever 32.

Figure 5:
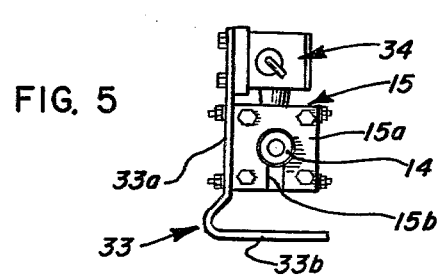
FIG. 5 is a fragmentary end elevational view taken along line 5—5 of FIG. 3.
Figure 4:
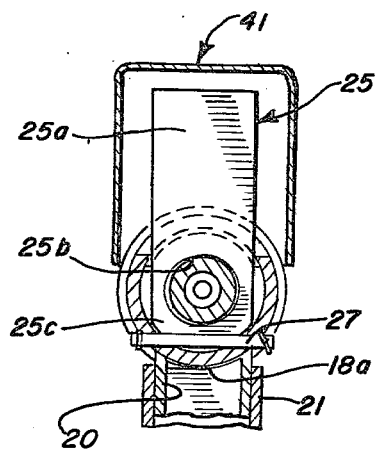
FIG. 4 is a fragmentary sectional view taken along line 4—4 of FIG. 3.

Telescoping element 15, as seen in FIG. 5, is connected to an upstanding leg 33a of an L-shaped bracket 33. Also connected to leg 33a and spaced above element 15 is a signal switch assembly 34. The second leg 33b of bracket 33 is spaced beneath element 15 and slidably engages an elongated tonguelike member 35 which is affixed to and extends rearwardly from housing 17, see FIG. 1.

Figure 6:
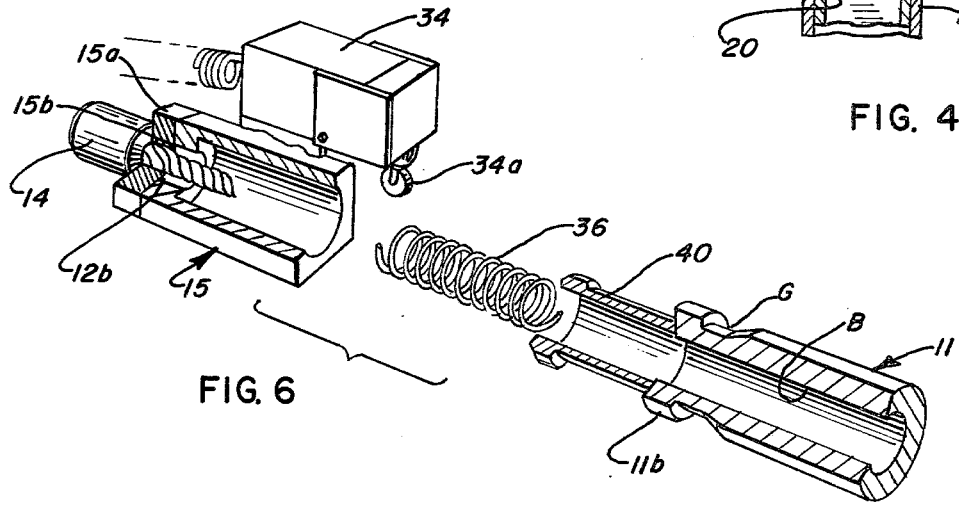
FIG. 6 is a fragmentary perspective view of a portion of the device of FIG. 2 and showing the components thereof in exploded relation.

Thus, by reason of bracket 33, the telescoping element 15 and switch assembly 34 are adapted to move endwise in a direction F with respect to the rear end portion 11b of member 11 in response to predetermined pulling forces exerted on the forward end 12a of the cable attaching means 12. It will be noted in FIGS. 3 and 6 that element 15 is normally in an axially extended position with respect to the rear end portion 11b of member 11 by reason of a coil spring 36 enclosed within element 15. Thus, the pulling force exerted upon the attaching means 12 must be of sufficient magnitude to overcome the bias of spring 36 before element 15, switch assembly 34, and bracket 33 will move longitudinally as a unit along member 11 towards the housing 18.

Carried on the front end portion of assembly 34 and depending therefrom is a vertically adjustable actuator 34a. The actuator is in rolling contact with an exterior segment of the member rear end portion 11b. Formed in the exterior segment is an annular groove G in which the depending end of the actuator 34a is disposed, when the telescoping element 15 assumes its normal extended position with respect to the rear end portion 11b of member 11, see FIG. 3. When the actuator end is disposed in groove G, the switch assembly 34 is in a first position of adjustment whereupon a visual, or audio, signaling device, not shown will assume a predetermined first condition to be hereinafter described. Extensible electrical leads 37 interconnect the switch assembly 34 with the signaling device.

When the predetermined external pulling force is exerted upon the attaching means 12, the element 15 and assembly 34 will move endwise of the member 11 towards housing 18 whereupon the actuator end 34a will roll out of groove G causing the actuator to be moved upwardly and the switch to assume a second position of adjustment whereupon the signaling device is in a predetermined second condition. Where, for example, the signaling device is a visual type, it may include a pair of lights mounted on the interior of the building and observable by the persons operating the lift trucks, etc., and a third light disposed on the exterior of the building and observable by the driver of the truck vehicle parked at the dock. Thus, with such a signaling device, when the actuator is disposed in groove G, only one light of the pair will be illuminated indicating to the dock personnel that the device is not in proper securing relation with a truck vehicle. Where, however, the actuator has been moved out of groove G, the other light of the pair, as well as the exterior light, will be illuminated indicating a safe condition exists.

In order to control the maximum extent to which elongated member 11 may extend forwardly from the locking assembly 17, a collar 38 is fixed to the exterior of member 11 between the housing 18 and the telescoping element 15, see FIG. 3.

When the maximum forward position of member 11 has been attained, collar 38 will abut the rear end plate 23 of the housing 18. Coil spring 36 disposed within member 15 will compensate for any change in the amount of force F exerted on the attaching cable 12, due to changes in the relative height of the truck bed with respect to dock surface Da during loading or unloading of the truck bed.

To control the maximum extent to which element 15 can retract relative to the rear end portion 11b of member 11, a spacer sleeve 40 is disposed within the element 15. Sleeve 40 encompasses the biasing spring 36 and maintains the latter in properly aligned relation with respect to the rear end of member 11 and the interior surface of element 15.

As seen in FIGS. 1 and 2, an inverted U-shaped handle H is pivotally connected to the front end 11a of elongated member 11. The handle facilitates endwise movement of the member 11 depending upon the positioning of the friction plates 15. When the hook 13 is being connected to or disconnected from the truck vehicle, the friction plates 15 are moved to their inoperative position by manipulation of lever 32 whereupon the member 11 can be moved to its fully extended (forward) position by the operator manually pulling forwardly (arrow F, FIG. 3) on handle H. When member 11 is in such a position, there is sufficient slack in the cable 12 to allow the hook 13 to be readily attached or detached with respect to the truck vehicle. Once, for example, the hook 13 has been properly attached to the truck vehicle, which has been previously parked against the loading dock, and the lever 32 manipulated so that the friction plates return to their operative position, the slack in the cable 12 is taken up by the operator pulling rearwardly (arrow R, FIG. 3) on the handle H whereby the member 11 will move rearwardly endwise relative to the locking assembly 17. Once the member 11 has been manually moved rearwardly to the fullest extent, the truck vehicle cannot then move away from the loading dock without causing the signaling device to assume an alert or first condition whereupon persons in the vicinity of the truck vehicle and dock know a dangerous situation exists and that no further loading or unloading should take place, or continue, until the dangerous situation has been corrected.

To protect various components of the securing device 10 from weather, dirt and/or vandalism, a protective hood 41 is provided which has the front end thereof attached by suitable fasteners 42 to the front end plate 22 of housing 18, see FIG. 1. The rear end portion of the hood 41 is supported by a U-shaped strap 43 which is affixed to the rear end of the tonguelike member 35. Suitable fasteners 44 secure the hood to the strap 43.

It will be noted in FIG. 1 that the bottom edge of hood 41 is spaced above the exterior of member 11 so as not to obstruct relative endwise movement of the latter. Furthermore, the front end wall of the hood is provided with an elongated slot 45 through which lever 32 extends and is free to move relative thereto.

Thus, it will be seen that an improved securing device has been provided which is of simple, compact construction, and yet is capable of withstanding rugged handling. The device may be readily installed and is capable of being attached to truck vehicles which vary in size and shape over a wide range. Furthermore, the improved device does not require any outside pneumatic, hydraulic or electrical source to retain the device in a locked condition.

We claim:

1. A device for use in releasably securing one unit against a second unit, said device comprising an elongated member; first means adjustably carried on an end of said elongated member remote from the one unit; an attaching means carried by said member and having one end thereof extending from a second end of said elongated member nearest the one unit and being adapted to be releasably connected to the one unit, said attaching means having a second end engaging said first means, the latter being adjustable in one direction relative to said elongated member in response to a predetermined pulling force exerted on said attaching means one end; and a locking assembly on which said elongated member is mounted for controlled endwise movement, said locking assembly being adapted to be adjustably mounted on the second unit and including friction means movable independently of said elongated member between operative and inoperative positions, said friction means, when in an operative position, engaging said elongated member and allowing endwise movement thereof only in direction away from the first unit, and, when in an inoperative position, allowing endwise movement in either direction, second means engaging said friction means and biasing said friction means into said operative position, and manually actuated means adjustable independently of said elongated member for moving said friction means from an operative position to an inoperative position.

2. The device of claim 1 wherein the locking assembly is adapted to be swivelly mounted on the second unit; the swivel axis being substantially perpendicular to and intersecting the longitudinal axis of said elongated member.

3. The device of claim 1 wherein the elongated member is of tubular configuration and the attaching means has a portion thereof extending therethrough and the second end of said attaching means is provided with a stop means, the latter being impassable with respect to the first means adjustably mounted on the end of said elongated member remote from the one unit.

4. The device of claim 1 wherein the friction means includes a plurality of confined platelike elements arranged in substantially face-to-face relation, each element being provided with an opening through which extends an exterior portion of the elongated member; said elements assuming an askewed relation with respect to the longitudinal axis of said elongated member and having perimetric segments of the openings in frictional engagement with the exterior of said elongated member, when said friction means is in said operative position.

5. The device of claim 4 wherein said locking assembly includes a housing in which at least a portion of each platelike element is confined, said elongated member extending through said housing and being movable relative thereto depending upon the positioning of said friction means; said platelike elements being tiltable as a unit about corresponding edges of the elements as a fulcrum, when said friction means is being moved between operative and inoperative positions.

6. The device of claim 1 wherein said first means is adjustable endwise in one direction relative to the end of said elongated member remote from the one unit in response to the said predetermined pulling force exerted on said attaching means one end.

7. The device of claim 6 wherein said first means includes a switch means movable relative to said elongated member and having a portion of said switch means actuated by said elongated member in response to said predetermined pulling force for effecting adjustment of a signal means to a predetermined first condition.

8. The device of claim 7 wherein the portion of said switch means is in rolling contact with an exterior portion of said elongated member, said exterior portion having a cam-like surface configuration.

9. The device of claim 7 wherein said first means, when the predetermined pulling force exerted on the attaching means is released, is biased to assume a predetermined position with respect to the end of said elongated member whereby said switch means is adapted to effect adjustment of the signal means to a predetermined second condition.

10. The device of claim 9 wherein the bias of said first means is effected by a spring disposed intermediate a portion of said first means and the end of the elongated member remote from the one unit; the biasing force of said spring varying in response to the amount of independent movement of the first means relative to said end of said elongated member.

* * * * *